United States Patent
Lee et al.

(10) Patent No.: US 11,843,400 B2
(45) Date of Patent: Dec. 12, 2023

(54) ELECTRONIC DEVICE FOR CONTROLLING OUTPUT OF ANTENNA BY USING APC OF COMMUNICATION MODULE, AND METHOD FOR OPERATION OF ELECTRONIC DEVICE

(71) Applicant: Samsung Electronics Co., Ltd., Suwon-si (KR)

(72) Inventors: Sungmin Lee, Suwon-si (KR); Yonghyun Park, Suwon-si (KR); Jeonggyun Park, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 17/285,902

(22) PCT Filed: Oct. 15, 2019

(86) PCT No.: PCT/KR2019/013491
§ 371 (c)(1),
(2) Date: Apr. 15, 2021

(87) PCT Pub. No.: WO2020/080787
PCT Pub. Date: Apr. 23, 2020

(65) Prior Publication Data
US 2021/0376866 A1 Dec. 2, 2021

(30) Foreign Application Priority Data
Oct. 15, 2018 (KR) .......................... 10-2018-0122367

(51) Int. Cl.
*H04L 5/12* (2006.01)
*H04B 1/00* (2006.01)
*H04B 17/10* (2015.01)
*H04B 1/3827* (2015.01)

(52) U.S. Cl.
CPC ......... *H04B 1/0064* (2013.01); *H04B 1/3838* (2013.01); *H04B 17/10* (2015.01)

(58) Field of Classification Search
CPC ..... H04B 1/0064; H04B 17/10; H04B 1/3838
(Continued)

(56) References Cited

U.S. PATENT DOCUMENTS

| | | | |
|---|---|---|---|
| 8,326,385 B2 | 12/2012 | Brogle et al. | |
| 9,209,839 B2 | 12/2015 | Rozenblit et al. | |

(Continued)

FOREIGN PATENT DOCUMENTS

| | | | |
|---|---|---|---|
| KR | 10-2014-0142862 A | 12/2014 | |
| KR | 10-2015-0105235 A | 9/2015 | |

(Continued)

OTHER PUBLICATIONS

International Search Report dated Jan. 21, 2020 in connection with International Patent Application No. PCT/KR2019/013491, 2 pages.
(Continued)

*Primary Examiner* — Zewdu A Kassa

(57) ABSTRACT

In an electronic device and a method for operation of the electronic device according to various embodiments, the electronic device may comprise: a sensor module for sensing whether an external object approaches the electronic device; a communication module for cellular communication; a first antenna for the cellular communication; a short-range wireless communication module for short-range wireless communication; a second antenna for the short-range wireless communication; and a processor, wherein the processor is configured to: check by means of the sensor module whether the external object approaches so as to be within a specified range, while transmitting a cellular signal with specified power through the first antenna; output a specified signal through the second antenna at least on the basis of deter- (Continued)

mining that the external object has approached so as to be within the specified range; acquire, by means of the second antenna, a signal returning after the specified signal is reflected by the external object; transmit a cellular signal having been adjusted to have lower power than the specified power, when the phase difference between the specified signal and the reflected signal falls within a specified range; and refrain from adjusting the specified power, when the phase difference falls outside the specified range. Various other embodiments are also possible.

15 Claims, 7 Drawing Sheets

(58) Field of Classification Search
USPC ............... 375/262, 261, 260, 219, 295, 316
See application file for complete search history.

(56) References Cited

U.S. PATENT DOCUMENTS

| | | |
|---|---|---|
| 2014/0361979 A1 | 12/2014 | Woo et al. |
| 2015/0255868 A1 | 9/2015 | Haddad et al. |
| 2016/0165551 A1* | 6/2016 | Lagnado ............. H04W 52/283 370/311 |
| 2017/0373712 A1 | 12/2017 | Kim et al. |
| 2018/0062684 A1 | 3/2018 | Kim |
| 2018/0175944 A1 | 6/2018 | Seyed et al. |

FOREIGN PATENT DOCUMENTS

| | | |
|---|---|---|
| KR | 10-1556067 B1 | 10/2015 |
| KR | 10-2018-0000088 A | 1/2018 |
| KR | 10-2018-0025710 A | 3/2018 |

OTHER PUBLICATIONS

Written Opinion of the International Searching Authority dated Jan. 21, 2020 in connection with International Patent Application No. PCT/KR2019/013491, 4 pages.

Korean Intellectual Property Office, "Decision of Patent," dated Apr. 27, 2023, in connection with Korean Patent Application No. 10-2018-0122367, 3 pages.

* cited by examiner

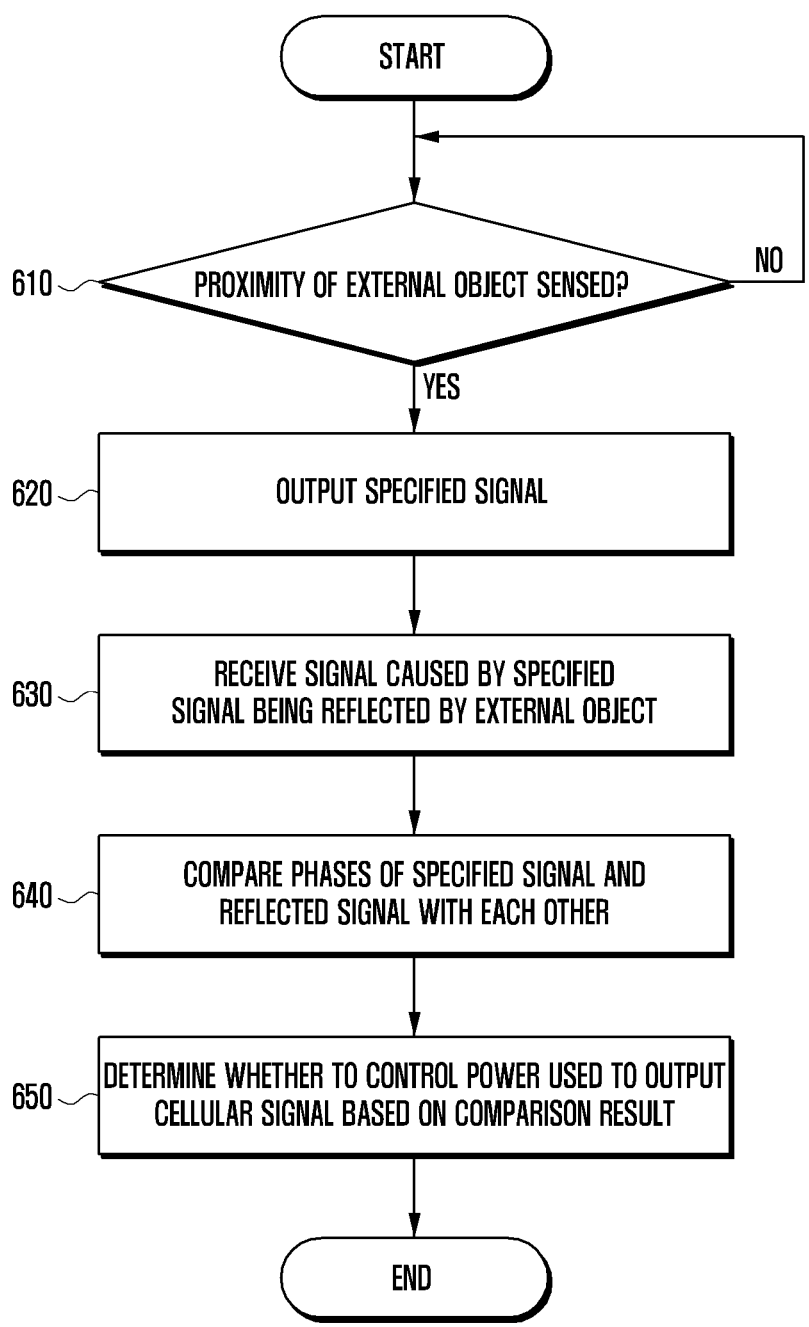

ELECTRONIC DEVICE FOR CONTROLLING OUTPUT OF ANTENNA BY USING APC OF COMMUNICATION MODULE, AND METHOD FOR OPERATION OF ELECTRONIC DEVICE

CROSS-REFERENCE TO RELATED APPLICATIONS

This application is a 371 of International Application No. PCT/KR2019/013491 filed on Oct. 15, 2019, which claims priority to Korean Patent Application No. 10-2018-0122367 filed on Oct. 15, 2018, the disclosures of which are herein incorporated by reference in their entirety.

BACKGROUND

1. Field

Various embodiments of the disclosure relate to an electronic device that controls an output of an antenna using an auto phase control (APC) of a communication module, and a method for operating the electronic device.

2. Description of Related Art

Various electronic devices, such as a smart phone, a tablet PC, a portable multimedia player (PMP), a personal digital assistant (PDA), a laptop personal computer (laptop PC), and a wearable device, have been spread.

The various electronic devices may be provided with communication functions, and may transmit/receive data to/from various electronic devices. In order to perform the communication, the electronic device may output a signal for the communication using an antenna of the electronic device.

A part of the signal output from the antenna may be absorbed by a user who uses the electronic device. The degree of absorption of an electromagnetic wave being absorbed by the user's human body may be defined as a specific absorption rate (SAR) of the electromagnetic wave, which is a ratio of a power of the electromagnetic wave being absorbed by the human body mass.

In the case of applying a high power to the antenna in order to output the signal, the specific absorption rate of the electromagnetic wave of the human body is increased, and this may cause an adverse effect to be exerted on the user's body. In order to reduce the specific absorption rate of the electromagnetic wave, the recent electronic device may be provided with a proximity sensor for sensing whether a part of the user's body approaches the electronic device or a grip sensor for sensing whether the user grasps the electronic device. The electronic device may reduce the specific absorption rate of the electromagnetic wave by reducing the strength of the signal being output from the antenna based on the sensing results of various sensors including the proximity sensor or the grip sensor.

In an electronic device to which technology to reduce the strength of a signal being output from an antenna based on the sensing results of various sensors including a proximity sensor or a grip sensor is applied, the electronic device senses whether a user grasps the electronic device in accordance with a change of capacitance of a capacitor included in the grip sensor, which is changed depending on the proximity of an external object to the capacitor.

The capacitance of the grip sensor may be changed not only in case of the user's grasp but also in case that the external object implemented by a different material (e.g., plastic, rubber, or metal) approaches the electronic device. In this case, even if the different material rather than a part of the user's body approaches the electronic device, the output of the signal being radiated from the antenna is reduced. Furthermore, the communication performance of the electronic device may deteriorate.

SUMMARY

According to various embodiments of the disclosure, an electronic device may include: a sensor module for sensing whether an external object approaches the electronic device; a communication module for cellular communication; a first antenna for the cellular communication; a short-range wireless communication module for short-range wireless communication; a second antenna for the short-range wireless communication; and a processor, wherein the processor is configured to: check whether the external object approaches so as to be within a specified range using the sensor module while transmitting a cellular signal with a specified power through the first antenna, output a specified signal through the second antenna at least based on determination that the external object has approached within the specified range, obtain a signal caused by the specified signal that is reflected by the external object using the second antenna, and transmit the cellular signal adjusted to have a lower power than the specified power in case that a phase difference between the specified signal and the reflected signal falls within a specified range, and refrain from adjusting the specified power in case that the phase difference does not fall within the specified range.

According to various embodiments of the disclosure, an electronic device may include: at least one sensor for sensing whether an external object approaches the electronic device; a communication module; at least one first antenna connected to the communication module; a short-range wireless communication module for short-range wireless communication; a second antenna for the short-range wireless communication; and a processor, wherein the processor is configured to: check whether the external object approaches so as to be within a specified range using the sensor, output a first signal through the second antenna at least based on determination that the external object has approached within the specified range, check a phase difference between the first signal and a second signal received by an auto phase control circuit of the short-range communication module, and control the communication module to transmit a signal adjusted to have a lower power than a specified power in case that a phase of the second signal is not different from a phase of the first signal as much as a specified value or more. According to various embodiments of the disclosure, a method for operating an electronic device may include: checking whether an external object approaches so as to be within a specified range using a sensor module for sensing whether the external object approaches the electronic device while transmitting a cellular signal with a specified power through a first antenna for transmitting the cellular signal; outputting a specified signal through the second antenna for transmitting a short-range wireless communication signal at least based on determination that the external object has approached within the specified range; obtaining a signal caused by the specified signal that is reflected by the external object using the second antenna; checking whether a phase difference between the specified signal and the reflected signal is included within a specified range; and determining whether to adjust the specified power based on the result of the checking.

According to the electronic device and the method for operating the electronic device according to the various embodiments of the disclosure, it is possible to discriminate whether the approaching external object is the user's body or an external object implemented by the different material using the specified signal radiated using the short-range communication module and the signal reflected by the external object in case that the proximity of the external object is sensed through the various sensors including the proximity sensor or the detection sensor.

According to the electronic device and the method for operating the electronic device according to the various embodiments of the disclosure, in case that the external object approaching the electronic device is the user's body, the strength of the signal being output from the antenna can be reduced, and the specific absorption rate of the electromagnetic wave can be reduced.

According to the electronic device and the method for operating the electronic device according to the various embodiments of the disclosure, in case that the external object is implemented by the different material, unnecessary degradation of the communication performance can be prevented by non-adjusting the strength of the signal being output from the antenna.

BRIEF DESCRIPTION OF THE DRAWINGS

FIG. 6 is an operational flowchart of a method for operating an electronic device according to various embodiments of the disclosure.

DETAILED DESCRIPTION

Figure 1:
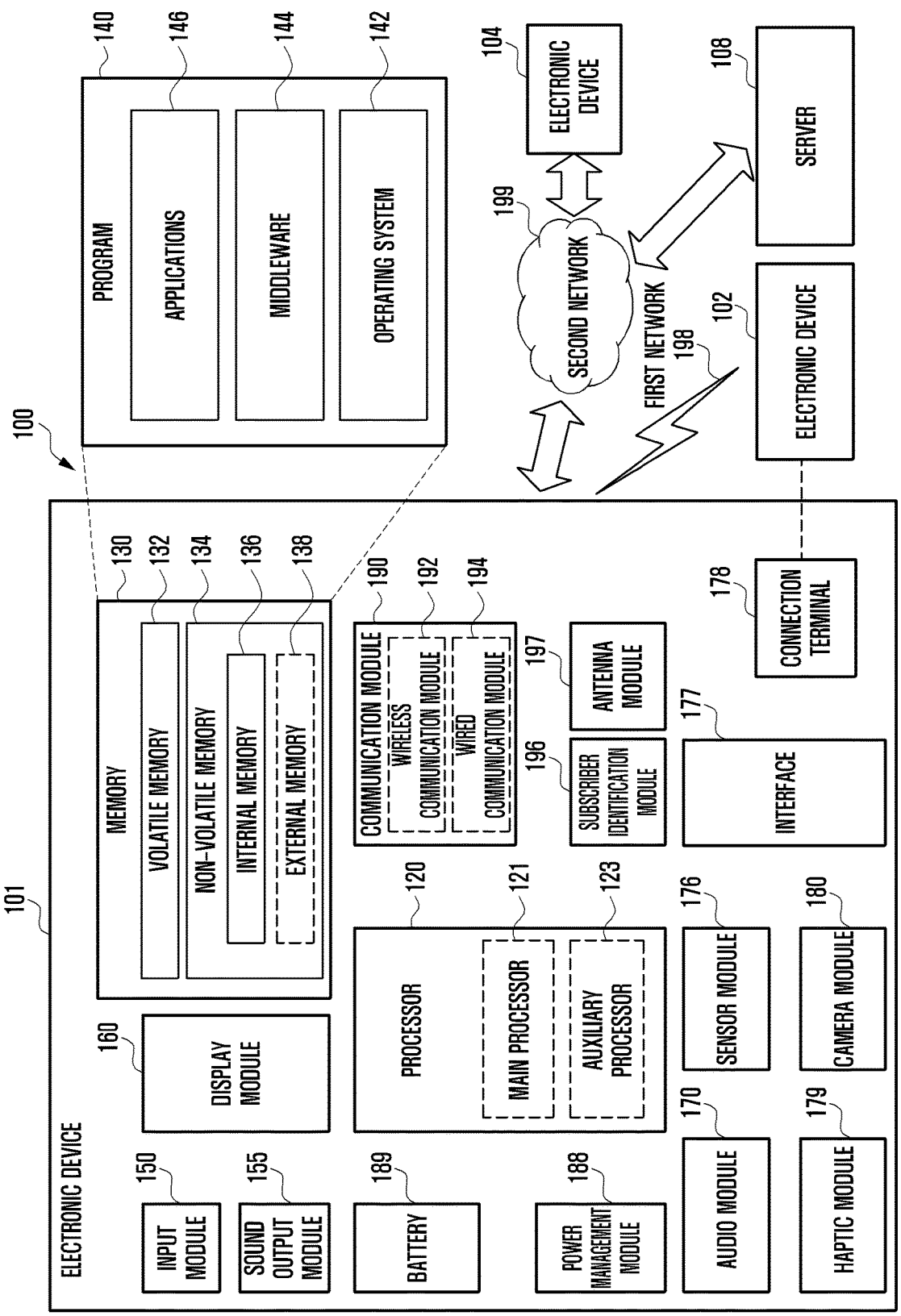
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
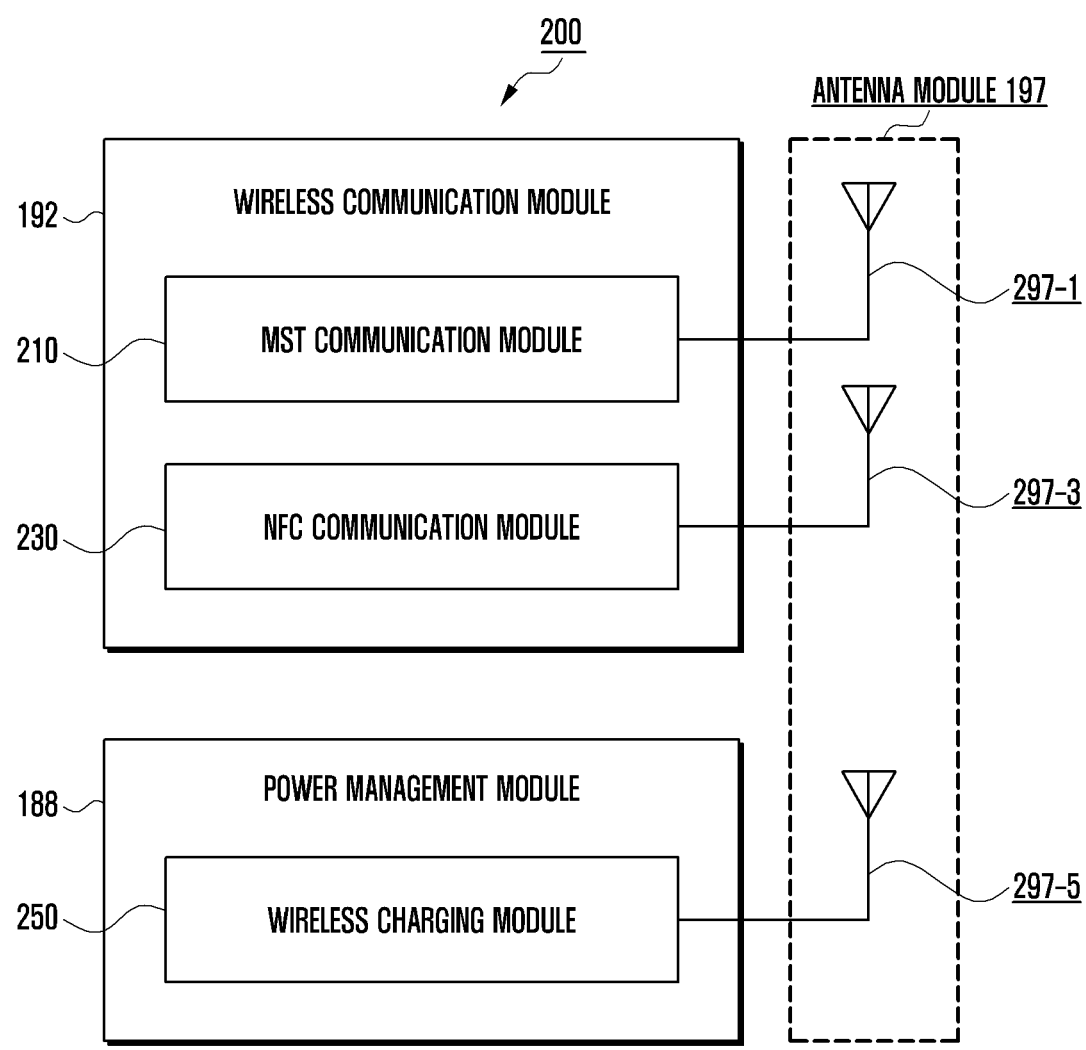
FIG. 2 is a block diagram of a wireless communication module, a power management module, and an antenna module included in an electronic device according to various embodiments of the disclosure.

FIG. 2 is a block diagram 200 illustrating the wireless communication module 192, the power management module 188, and the antenna module 197 of the electronic device 101 according to various embodiments. Referring to FIG. 2, the wireless communication module 192 may include a magnetic secure transmission (MST) communication module 210 or a near-field communication (NFC) module 230, and the power management module 188 may include a wireless charging module 250. In such a case, the antenna module 197 may include a plurality of antennas that include a MST antenna 297-1 connected with the MST communication module 210, a NFC antenna 297-3 connected with the NFC communication module 230, and a wireless charging antenna 297-5 connected with the wireless charging module 250. For ease of description, the same components as those described in regard to FIG. 1 are briefly described or omitted from the description.

The MST communication module 210 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 210 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102.

According to an embodiment, for example, payment-related information and a control signal that are received by the electronic device 102 in the form of the magnetic signal may be further transmitted to an external server 108 (e.g., a payment server) via the network 199.

The NFC communication module 230 may obtain a signal containing control information or payment information such as card information from the processor 120 and transmit the obtained signal to the external electronic device 102 via the NFC antenna 297-3. According to an embodiment, the NFC communication module 230 may receive such a signal transmitted from the external electronic device 102 via the NFC antenna 297-3.

The wireless charging module 250 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 197 may include a switching circuit (not shown) adapted to selectively connect (e.g., close) or disconnect (e.g. open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

Figure 3:
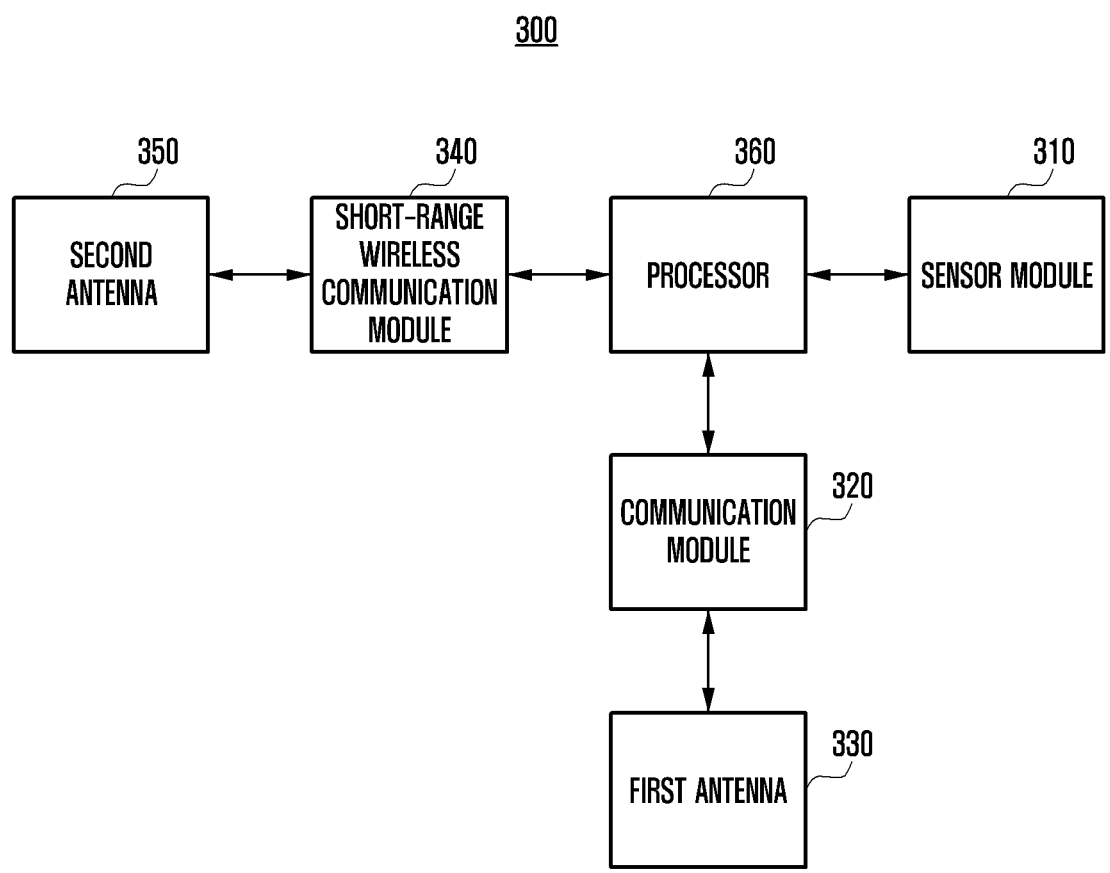
FIG. 3 is a block diagram of an electronic device according to various embodiments of the disclosure.

FIG. 3 is a block diagram of an electronic device according to various embodiments of the disclosure.

An electronic device 300 (e.g., electronic device 101 of FIG. 1) according to various embodiments of the disclosure may include a sensor module 310, a communication module 320, a first antenna 330, a short-range wireless communication module 340, a second antenna 350, and a processor 360.

According to various embodiments of the disclosure, the sensor module 310 may sense proximity of an external object (not illustrated) to the electronic device 300 or contact of the external object on the electronic device 300. The sensor module 310 may sense the proximity or contact of the external object in various ways.

For example, the sensor module 310 may measure capacitance of a capacitor included in the sensor module 310. The sensor module 310 may sense the proximity or contact of the external object with respect to the electronic device 300 based on a change amount of the capacitance that is changed in accordance with the proximity or contact of the external object.

As another example, the sensor module 310 may output various types of signals (e.g., infrared rays or ultrasonic waves), and receive signals caused by the output signals being reflected by the external object. The sensor module 310 may sense the proximity or contact of the external object with respect to the electronic device 300 based on the characteristics of the reflected signal (e.g., reception time of the reflected signal or strength of the reflected signal).

According to various embodiments of the disclosure, the communication module 320 may perform communication with an external electronic device (not illustrated) based on the control of the processor 360. The communication module 320 may support cellular communication (e.g., 3G, 4G, or 5G). The communication module 320 may also support various communication methods including Wi-Fi and Bluetooth. The communication module 320 may be electrically connected to the first antenna 330, and may perform communication using the first antenna 330. Although FIG. 3 illustrates that one antenna is connected to the communication module 320, the communication module 320 may be connected to a plurality of antennas in accordance with the supportable communication methods.

According to various embodiments of the disclosure, the short-range wireless communication module 340 may perform short-range wireless communication based on the control of the processor 360. The short-range wireless communication may include near field communication (NFC) supporting bidirectional communication or radio frequency identification (RFID) supporting unidirectional communication. The NFC communication method may be implemented in a situation where an NFC tag storing data and the electronic device 300 approach or contact each other within a specified distance. According to the NFC communication method, data stored in the NFC tag may be transmitted to the electronic device 300. The short-range wireless communication module 340 may receive the data stored in the NFC tag, receive various kinds of content using the data stored in the NFC tag, and provide the received content to a user. The short-range wireless communication module 340 may be electrically connected to the second antenna 350, and may perform communication using the second antenna 350.

According to various embodiments of the disclosure, the processor 360 may control the communication module 320 to perform cellular communication, and may control the short-range wireless communication module 340 to perform the short-range wireless communication.

According to various embodiments of the disclosure, the processor 360 may transmit a cellular communication signal with a specified power through the first antenna 330 while performing data transmission/reception using the cellular communication method. The specified power may mean a power necessary to smoothly perform the cellular communication. According to an embodiment, the processor 360 may control the specified power based on the environment of the electronic device 300. In another embodiment, the specified power may be changed by a designer of the electronic device 300.

According to various embodiments of the disclosure, at least a part of a cellular signal output through the first antenna 330 may be absorbed by the human body of the user of the electronic device 300. The degree of absorption of the cellular signal in the human body may be defined as a specific absorption rate (SAR) of the electromagnetic wave, which is a ratio of a power of the electromagnetic wave being absorbed by the human body to a human body mass. As the specific absorption rate of the electromagnetic wave becomes higher, the electromagnetic wave being absorbed by the human body is increased, and this may harm health of the user of the electronic device 300. The processor 360 may check whether the external object (e.g., part of the human body including user's face or hand) approaches so as to be within a specified range using the sensor module 310, and if the external object has approached within the specified range, the processor 360 may perform adjustment of the specified power (e.g., reduction of the level of the specified power) being supplied to the communication module 320 to output the cellular signal.

According to various embodiments of the disclosure, in case that the sensor module 310 is implemented to sense the proximity or contact of the external object with respect to the electronic device 300 based on the change amount of the capacitance that is changed in accordance with the proximity or contact of the external object, it may be difficult for the sensor module 310 to accurately sense the kind of the external object. For example, there may be a problem in that it is difficult for the sensor module 310 to discriminate whether the external object is a part of the user's body or a metal. In this case, the processor 360 may adjust the specified power being supplied to the communication module 320 even if the metal that is not the part of the user's body approaches the electronic device 300. In case that another external object that is not the part of the user's body approaches the electronic device 300, the electronic device 300 (e.g., processor 360) may adjust the specified power being supplied to the communication module 320 to output the cellular signal although it is not necessary to adjust the specified power. The above-described phenomenon may degrade the performance for the cellular communication of the electronic device 300.

The electronic device 300 according to various embodiments of the disclosure may not adjust the specified power being supplied to the communication module 320 to output the cellular signal in case that another external object that is not the user's body approaches or contacts the electronic device 300 using the short-range wireless communication module 340, but may adjust the specified power being supplied to the communication module 320 to output the cellular signal in case that the external object that is the part of the user's body approaches or contacts the electronic device 300. Hereinafter, detailed embodiments will be described, in which the electronic device 300 adjusts the specified power being supplied to the communication module 320 using the short-range wireless communication module 340.

According to various embodiments of the disclosure, the processor 360 may check whether the external object approaches or contacts so as to be within the specified range using the sensor module 310.

According to various embodiments of the disclosure, the processor 360 may control the short-range wireless communication module 340 to output the specified signal through the second antenna 350 corresponding to checking that the sensor module 310 senses the proximity or contact of the external object within the specified range. The specified signal may be a signal generated by the short-range wireless communication module 340 to discriminate the kind of the external object or a signal generated by the short-range wireless communication module 340 to perform the short-range wireless communication.

According to various embodiments of the disclosure, the short-range wireless communication module 340 may receive a second signal in which the phase of a part of the specified signal is changed by the external object. For example, the short-range wireless communication module 340 may receive, through a separate feedback path (e.g., 530 of FIG. 5), the second signal in which the phase of the part of the specified signal being output through the second antenna 350 is changed by the external object. The short-range wireless communication module 340 may check the characteristics of the second signal. The characteristics of the phase-changed signal may mean various characteristics including the phase or signal strength. As another example, the short-range wireless communication module 340 may obtain the second signal caused by the specified signal being output through the second antenna 350, which is reflected by the external object. The reflected signal may be received by the second antenna 350. The second signal may be received by an auto phase control circuit (e.g., auto phase control circuit 540 of FIG. 5) of the short-range wireless communication module 340. As the second signal, a part of the radiated signal may be abandoned and transmitted to the auto phase control circuit 540, or the part of the radiated signal may be reflected by the external object and transmitted to the auto phase control circuit 540.

According to various embodiments of the disclosure, the short-range wireless communication module 340 may compare a difference between the phase of the second signal and the phase of the specified signal. The degree of phase difference of the second signal may differ in accordance with the characteristics of the external object. For example, in case that the external object is a part of the user's body, the phase of the second signal may be earlier than the phase of the specified signal by 60 to 70 degrees. In case that the external object is another object (e.g., metal) that is not a part of the user's body, the phase of the second signal may be earlier than the phase of the specified signal by 90 to 120 degrees. The detailed contents related to the phase will be described later with reference to FIG. 6. The short-range wireless communication module 340 may check a difference value between the phase of the second signal and the phase of the specified signal, and may transmit the result of the checking to the processor 360.

According to various embodiments of the disclosure, the processor 360 may receive the difference between the phase of the second signal and the phase of the specified signal transmitted by the short-range wireless communication module 340, and may determine whether to adjust the level of the power being applied to the communication module 320 based on the phase difference. The processor 360 may check whether the difference between the phase of the second signal and the phase of the specified signal falls within a specified range.

According to various embodiments of the disclosure, the specified range may mean a range capable of discriminating the external object that is a part of the user's body and the external object that is not a part of the user's body from each other. The specified range may also be changed in accordance with the designer's intention within the range capable of discriminating the external object that is the part of the user's body and the external object that is not the part of the user's body from each other.

According to various embodiments of the disclosure, in case that the external object is the part of the user's body, the difference between the phase of the second signal and the phase of the specified signal may be included within the specified range. In case that the external object is another object (e.g., metal) that is not the part of the user's body, the difference between the phase of the second signal and the phase of the specified signal may not be included within the specified range.

According to various embodiments of the disclosure, in case that the difference between the phase of the second signal and the phase of the specified signal falls within the specified range, the processor 360 may reduce the level of the specified power being applied to the communication module 320. In case that the difference between the phase of the second signal and the phase of the specified signal falls within the specified range, the external object that approaches the electronic device 300 may be the part of the user's body. The processor 360 may reduce the specific absorption rate of the electromagnetic wave by reducing the level of the specified power being applied to the communication module 320.

According to various embodiments of the disclosure, in case that the difference between the phase of the second signal and the phase of the specified signal does not fall within the specified range, the processor 360 may not perform the reduction of the level of the specified power being applied to the communication module 320. For example, in case that the difference between the phase of the second signal and the phase of the specified signal does not fall within the specified range, the processor 360 may maintain the level of the specified power being applied to the communication module 320. In case that the difference between the phase of the second signal and the phase of the specified signal does not fall within the specified range, the external object that approaches the electronic device 300 may be another external object that is not the part of the user's body. The processor 360 may prevent unnecessary degradation of the cellular communication performance by maintaining the level of the specified power being applied to the communication module 320.

According to various embodiments of the disclosure, the processor 360 may increase the level of the specified power being applied to the communication module 320 based on the difference value between the phase of the second signal and the phase of the specified signal. For example, in case that the difference value between the phase of the second signal and the phase of the specified signal is equal to or larger than a predetermined value, the external object may be an object implemented by a metal material. In case that the external object approaching the electronic device 300 is implemented by the metal material, the cellular communication performance may be reduced due to the characteristics of the metal material (reflection, refraction, or absorption of the cellular signal). In case that the difference value between the phase of the second signal and the phase of the specified signal is equal to or larger than the predetermined value, the processor 360 may increase the level of the specified power being applied to the communication module 320. The processor 360 may improve the performance of the cellular communication by increasing the level of the specified power being applied to the communication module 320.

Although the level of the power being applied to the communication module 320 that performs the cellular communication has been described with reference to FIG. 3, the communication module may also be applied to various wireless communications in addition to the cellular communication. For example, the communication module 320 may be a communication module capable of supporting various wireless communications including Wi-Fi and Bluetooth, and the processor 360 may control the specified power being applied to the communication module capable of supporting the various wireless communications based on the difference value between the phase of the reflected signal and the phase of the specified signal.

According to various embodiments of the disclosure, the processor 360 may check whether an external electronic device connected to the electronic device 300 exists corresponding to checking that the sensor module 310 senses the proximity or contact of the external object within the specified range. The external electronic device (not illustrated) may be an accessary device for supporting various functions of the electronic device 300. For example, the external electronic device (not illustrated) may be an earphone, a microphone, or a speaker being connected to the electronic device 300 through a communication means including Bluetooth or Wi-Fi. In case that the external electronic device exists, the processor 360 may check identification information of the external electronic device.

According to various embodiments of the disclosure, the processor 360 may check the type of the external electronic device (e.g., microphone, earphone, or speaker) through the identification information of the external electronic device, and may determine whether to perform the adjustment of the specified power being supplied to the communication module 320 in accordance with the type of the external electronic device. For example, the processor 360 may check that the external electronic device connected to the electronic device 300 is a wireless earphone provided with a microphone based on the identification information of the external electronic device. In case that the user of the electronic device 300 performs cellular communication (e.g., voice over LTE (VoLTE)) using the wireless earphone, the user may be in a situation where the user does not approach the electronic device 300. In this case, the processor 360 may be in a situation where the processor 360 does not have to reduce the level of the specified power being applied to the communication module 320. According to various embodiments of the disclosure, the processor 360 may determine whether to perform the adjustment of the specified power being supplied to the communication module 320 based on the identification information of the external electronic device. For example, the processor 360 may check the identification information of the external electronic device, and if it is checked that the external electronic device is the wireless earphone provided with the microphone, the processor 360 may not perform the operation of reducing the level of the specified power being applied to the communication module 320.

Figure 4A:
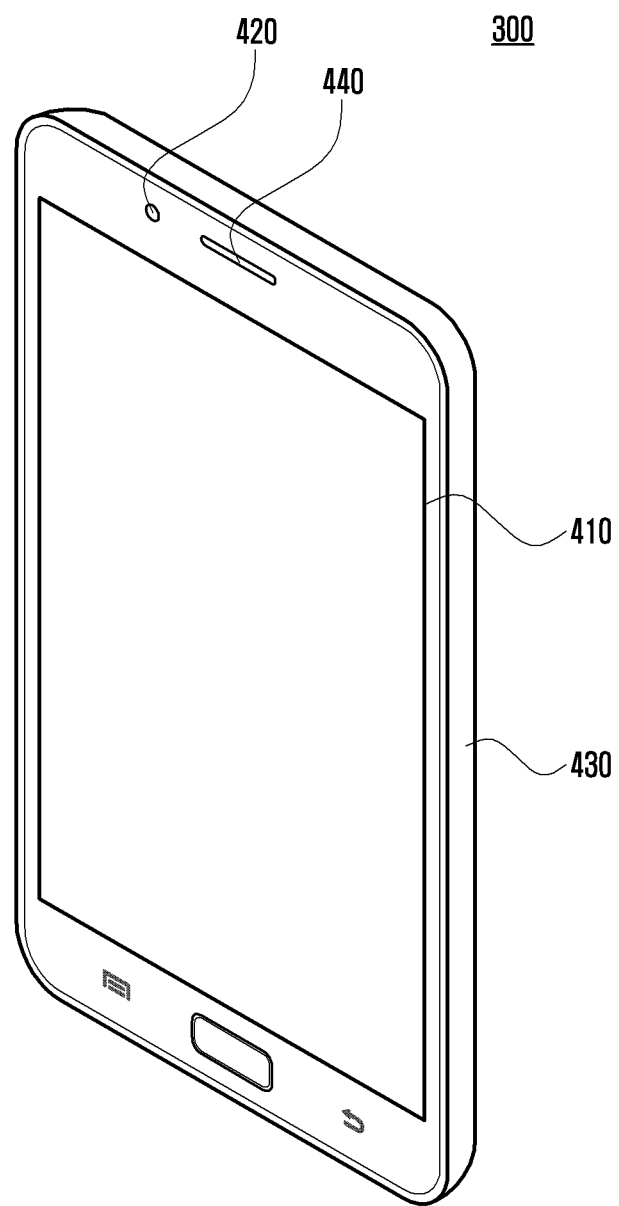
FIG. 4A is a diagram illustrating a sensor module sensing the proximity of an external object in an electronic device according to various embodiments of the disclosure.

FIG. 4A is a diagram illustrating a sensor module sensing the proximity of an external object in an electronic device according to various embodiments of the disclosure.

Referring to FIG. 4A, the electronic device (e.g., electronic device 300 of FIG. 3) according to various embodiments of the disclosure may be provided with the sensor module (e.g., sensor module 310 of FIG. 3) for sensing the proximity of the external object (not illustrated) to the electronic device 300 or the contact of the external object on the electronic device 300.

According to various embodiments of the disclosure, the sensor module 310 may sense the proximity or contact of the external object in various ways, and may be provided with a plurality of sensors (e.g., first sensor 420 or second sensor 430).

According to various embodiments of the disclosure, the first sensor 420 may output various types of signals (e.g., infrared rays or ultrasonic waves), and receive signals caused by the output signals being reflected by the external object. The first sensor 420 may sense the proximity or contact of the external object with respect to the electronic device 300 based on the characteristics of the reflected signal (e.g., reception time of the reflected signal or strength of the reflected signal). The first sensor 420 may be disposed adjacent to a display 410 (e.g., display device 160 of FIG. 1) or a speaker 440. After a device user grasps the electronic device 300 for calling, the first sensor 420 may sense whether the electronic device 300 approaches or contacts a part of the user's body (e.g., ear of the user).

According to various embodiments of the disclosure, the second sensor 430 may measure the capacitance of the capacitor included in the second sensor 430. The second sensor 430 may sense the proximity or contact of the external object with respect to the electronic device 300 based on the change amount of the capacitance that is changed in accordance with the proximity or contact of the external object.

According to various embodiments of the disclosure, the second sensor 430 may sense whether the user grasps the electronic device 300. For this, the second sensor 430 may be disposed in an area in which a part of the user's body (e.g., user's hand) can easily contact the electronic device 300 in order for the user to grasp the electronic device 300. For example, the area in which the part of the user's body (e.g., user's hand) can easily contact the electronic device 300 may be an area that is implemented by a metal material on the top, bottom, left, or right side of the electronic device 300 or an area in which the antenna is disposed.

Figure 4B:
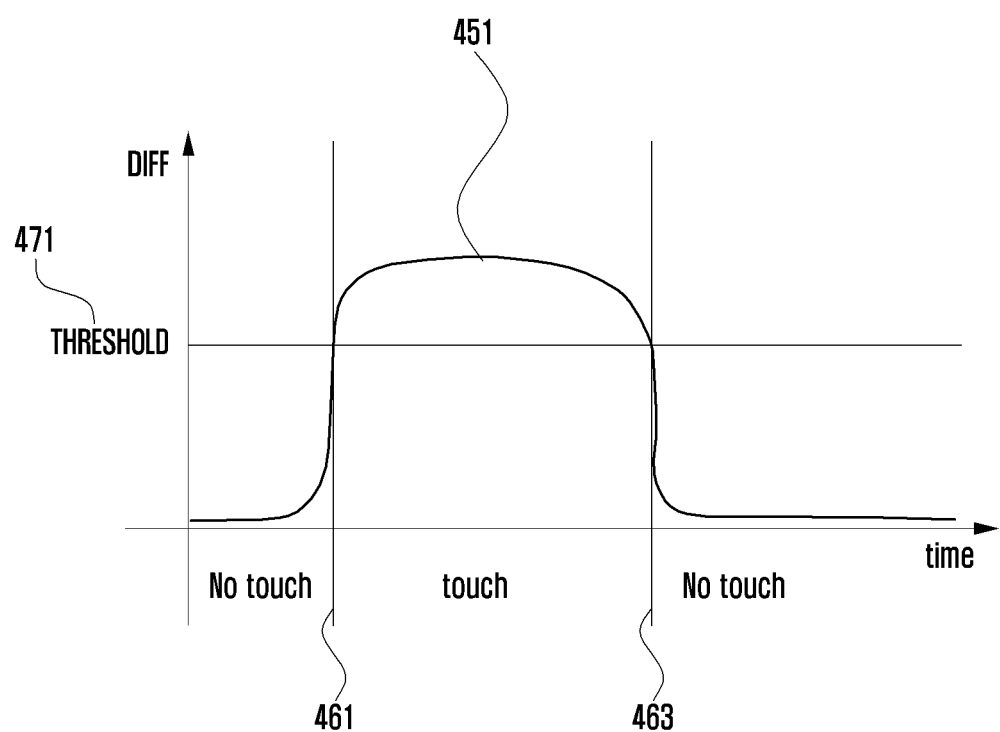
FIG. 4B is a diagram illustrating a capacitance change of a capacitor included in a grip sensor module by means of an external object approaching an electronic device in the electronic device according to various embodiments of the disclosure.

FIG. 4B is a diagram illustrating a capacitance change of a capacitor included in a sensor module by means of an external object approaching an electronic device in the electronic device according to various embodiments of the disclosure.

Referring to FIG. 4B, a capacitance change is illustrated, while a distance between the external object and the electronic device is decreased as the external object approaches or contacts the electronic device (e.g., electronic device 300 of FIG. 3), and then the distance between the external object and the electronic device is increased again.

According to various embodiments of the disclosure, the sensor module (e.g., sensor module 310 of FIG. 3) sensing whether the external object and the electronic device approach each other based on the change amount of the capacitance may measure the capacitance for each predetermined period. The change amount 451 of the capacitance may mean a difference between the capacitance value being measured in case that the external object does not approach the electronic device and the capacitance value being measured in case that the external object approaches the electronic device.

Referring to FIG. 4B, the sensor module 310 may check that the change amount 451 of the capacitance exceeds a predetermined value 471 from a first time point 461 to a second time point 463. The sensor module 310 may determine that the distance between the external object and the electronic device 300 is within a specified distance corresponding to checking that the change amount of the capacitance exceeds the predetermined value 471.

According to various embodiments of the disclosure, the change amount of the capacitance may differ in accordance with the material of the external object. The change amounts of the capacitance in accordance with the materials of the external object are exemplarily described in Table 1.

TABLE 1

| Material of external object | Change amount of capacitance |
|---|---|
| Wood | 2478 |
| Paper | 1987 |
| Water | 4301 |
| Metal | 7257 |
| Plastic | 617 |
| Tempered glass | 3500 |
| Part of human body | 7459 |

Referring to Table 1, it can be checked there is not a big difference in capacitance change amount between the external object of a metal material and a part of the human body. In case that the electronic device 300 determines whether to adjust the specified power being supplied to the communication module 320 using the sensor module 310 only, the specified power being supplied to the communication module 320 is reduced in a situation where the external object implemented by the metal material approaches or contacts the electronic device 300, and thus the performance for the cellular communication of the electronic device 300 may be degraded. The electronic device 300 according to various embodiments of the disclosure can determine whether to adjust the specified power being supplied to the communication module 320 using the sensor module 310 and the short-range communication module 340, and thus can prevent the reduction of the specified power being supplied to the communication module 320 in an unnecessary situation (e.g., in a situation where the external object implemented by the metal material approaches or contacts the electronic device 300).

Figure 5:
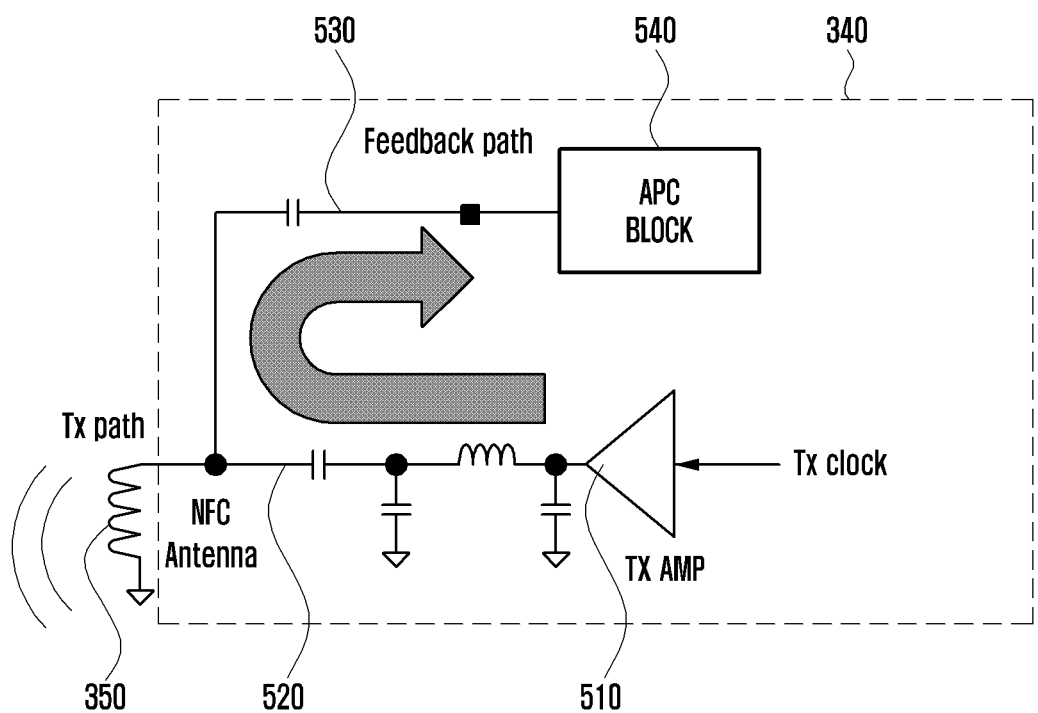
FIG. 5 is a circuit diagram illustrating an auto phase control circuit included in a short-range wireless communication module in an electronic device according to various embodiments of the disclosure.

FIG. 5 is a circuit diagram illustrating an auto phase control circuit included in a short-range wireless communication module in an electronic device according to various embodiments of the disclosure.

Referring to FIG. 5, a short-range wireless communication module (e.g., short-range communication module 340 of FIG. 3) and a second antenna (e.g., second antenna 350 of FIG. 3) connected to the short-range wireless communication module 340 are illustrated.

According to various embodiments of the disclosure, the short-range wireless communication module 340 may include an amplifier 510 for amplifying a specified signal, a first transmission path 520 in which the amplified specified signal is transmitted, a second transmission path 530 in which a second signal obtained through reflection of the specified signal by means of the external object or through abandonment of a part of the specified signal, is transmitted, and an auto phase control circuit 540 comparing the phase of the specified signal with the phase of the reflected signal.

According to various embodiments of the disclosure, the specified signal may be amplified by the amplifier 510, and may be transmitted to the second antenna 350 through the first transmission path 520. The second antenna 350 may radiate the specified signal.

According to various embodiments of the disclosure, the second antenna 350 may radiate a signal that can be used in the NFC communication method. The radiated signal may be reflected by the external object. The reflected signal may be received by the second antenna 350, and may be transmitted to the auto phase control circuit 540 through the second transmission path 530.

According to various embodiments of the disclosure, a part of the radiated signal may have a phase that is changed by the external object, and may be transmitted to the auto phase control circuit 540 through the second transmission path 530 in a phase-changed state.

The auto phase control circuit 540 may compare the phase of the specified signal with the phase of the second signal, and may control the characteristics (e.g., frequency of the signal and phase of the signal) of the signal being output by the short-range wireless communication module 340 based on the result of the comparison. The auto phase control circuit 540 can improve the performance of the NFC communication method by controlling the characteristics of the signal being output by the short-range wireless communication module 340.

According to various embodiments of the disclosure, the difference values between the phase of the second signal and the phase of the specified signal may be discriminated from one another as in Table 2 below.

TABLE 2

| Index | Phase difference value |
|---|---|
| 0 | 109~120 |
| 1 | 97~108 |
| 2 | 85~96 |
| 3 | 73~84 |
| 4 | 61~72 |
| 5 | 49~60 |
| 6 | 37~48 |
| 7 | 25~36 |
| 8 | 13~24 |
| 9 | 0~12 |

According to various embodiments of the disclosure, the phase difference value 1 may mean about 0.12 ns based on 13.56 MHz that is the frequency of the NFC signal.

According to various embodiments of the disclosure, the auto phase control circuit 540, separately from its original purpose, may compare the phase of the specified signal with the phase of the second signal to discriminate the external object that approaches the electronic device 300. Table 3 below describes phase difference values measured by the auto phase control circuit 540 in case that the external object implemented by the metal material and the external object that is a part of the user's body approach the electronic device 300, respectively.

TABLE 3

| Distance between electronic device 300 and external object | Index[Value] in case of external object manufactured by metal material | Index[Value] in case of external object that is a part of human body |
|---|---|---|
| ∞ (Non-proximity) | 4[65] | 4[66] |
| 30 mm | 4[68] | 4[65] |
| 20 mm | 4[70] | 4[67] |
| 15 mm | 4[72] | 4[65] |
| 10 mm | 3[79] | 4[65] |
| 5 mm | 2[93] | 4[64] |
| 3 mm | 1[104] | 4[65] |
| 0 mm (Contact) | 0[120] | 4[65] |

Referring to Table 3, the difference between the phase of the second signal and the phase of the specified signal may differ in accordance with the material of the external object. In case of the external object implemented by the metal material, it can be checked that the difference between the phase of the second signal and the phase of the specified signal is increased as the distance between the external object and the electronic device is decreased. In case that the external object is a part of the human body, it can be checked that the differences between the phase of the second signal and the phase of the specified signal are substantially constant regardless of the distance between the external object and the electronic device.

According to various embodiments of the disclosure, in case that the difference between the phase of the second signal and the phase of the specified signal falls within the specified range (e.g., in case that the phase difference has a range of index 4 or more in Table 3), the processor (e.g., processor 360 of FIG. 3) may reduce the level of the specified power being applied to the communication module 320. The external object that approaches the electronic device 300 may be a part of the user's body. The processor 360 can reduce the specific absorption rate of the electromagnetic wave by reducing the level of the specified power being applied to the communication module 320.

According to various embodiments of the disclosure, in case that the difference between the phase of the second signal and the phase of the specified signal does not fall within the specified range (e.g., in case that the phase difference has a range of index 3 or less in Table 3), the processor 360 may not perform the reduction of the level of the specified power being applied to the communication module 320. In case that the difference between the phase of the second signal and the phase of the specified signal does not fall within the specified range, the external object that approaches the electronic device 300 may be another external object that is not the part of the user's body. The processor 360 can prevent unnecessary degradation of the cellular communication performance by maintaining the level of the specified power being applied to the communication module 320.

An electronic device according to various embodiments of the disclosure may include: a sensor module for sensing whether an external object approaches the electronic device; a communication module for cellular communication; a first antenna for the cellular communication; a short-range wireless communication module for short-range wireless communication; a second antenna for the short-range wireless communication; and a processor, wherein the processor is configured to: check whether the external object approaches so as to be within a specified range using the sensor module while transmitting a cellular signal with a specified power through the first antenna, output a specified signal through the second antenna at least based on determination that the external object has approached within the specified range, obtain a signal caused by the specified signal that is reflected by the external object using the second antenna, and transmit the cellular signal adjusted to have a lower power than the specified power in case that a phase difference between the specified signal and the reflected signal falls within a specified range, and refrain from adjusting the specified power in case that the phase difference does not fall within the specified range.

In the electronic device according to various embodiments of the disclosure, the processor may be configured to: check whether a phase of the reflected signal is different from a phase of the specified signal as much as a specified value or more, and determine whether to perform adjustment of the specified power based on the result of the checking.

In the electronic device according to various embodiments of the disclosure, the short-range communication module may be configured to: check the phase difference between the specified signal and the reflected signal, and transmit information on the checked phase difference to the processor.

In the electronic device according to various embodiments of the disclosure, the short-range communication module may be configured to: check the phase difference between the specified signal and the reflected signal, and control a signal being output to the second antenna based on the checked phase difference.

In the electronic device according to various embodiments of the disclosure, the electronic device may further include a Wi-Fi communication module for Wi-Fi communication, wherein the processor is configured to: transmit a Wi-Fi signal adjusted to have a lower power than the specified power in case that a phase difference between the specified signal and the reflected signal falls within the specified range, and refrain from adjusting the specified power in case that the phase difference does not fall within the specified range.

In the electronic device according to various embodiments of the disclosure, the processor may be configured to: check whether an external electronic device wirelessly connected to the electronic device exists, check identification information of the external electronic device in case that the external electronic device exists, and determine whether to perform adjustment of the specified power based on the identification information.

In the electronic device according to various embodiments of the disclosure, the sensor module may be so configured that the external object senses whether the electronic device is grasped.

In the electronic device according to various embodiments of the disclosure, the electronic device may further include a second proximity sensor sensing proximity on a display of the electronic device, wherein the processor is configured to determine whether to perform the adjustment of the specified power based on the sensing result of the second proximity sensor and the phase difference between the specified signal and the reflected signal.

An electronic device according to various embodiments of the disclosure may include: at least one sensor for sensing whether an external object approaches the electronic device; a communication module; at least one first antenna connected to the communication module; a short-range wireless communication module for short-range wireless communication; a second antenna for the short-range wireless communication; and a processor, wherein the processor is configured to: check whether the external object approaches so as to be within a specified range using the sensor, output a first signal through the second antenna at least based on determination that the external object has approached within the specified range, check a phase difference between the first signal and a second signal received by an auto phase control circuit of the short-range communication module, and control the communication module to transmit a signal adjusted to have a lower power than a specified power in case that a phase of the second signal is not different from a phase of the first signal as much as a specified value or more.

In the electronic device according to various embodiments of the disclosure, the processor may be configured to control the communication module to transmit a signal adjusted to have a higher power than the specified power in case that the phase of the second signal is different from the phase of the first signal as much as the specified value or more.

In the electronic device according to various embodiments of the disclosure, the processor may be configured not to perform reduction of the specified power in case that the phase of the second signal is different from the phase of the first signal as much as the specified value or more.

In the electronic device according to various embodiments of the disclosure, the processor may be configured to: check whether an external electronic device wirelessly connected to the electronic device exists, check identification information of the external electronic device in case that the external electronic device exists, and determine whether to perform adjustment of the specified power based on the identification information.

FIG. 6 is an operational flowchart of a method for operating an electronic device according to various embodiments of the disclosure.

Referring to FIG. 6, according to the method for operating an electronic device according to various embodiments of the disclosure, at operation 610, the electronic device (e.g., electronic device 300 of FIG. 3) may sense whether the external object approaches.

According to various embodiments of the disclosure, the electronic device 300 may sense whether the external object approaches while transmitting a cellular signal with a specified power through the first antenna (e.g., first antenna 330 of FIG. 3). The specified power may mean a power necessary to smoothly perform the cellular communication. The specified power may also be changed by a designer of the electronic device 300.

According to various embodiments of the disclosure, the electronic device 300 may sense whether the external object approaches within a specified range of the electronic device using the sensor module (e.g., sensor module 310 of FIG. 3).

According to various embodiments of the disclosure, the sensor module 310 may sense the proximity of the external object (not illustrated) to the electronic device 300 or the contact of the external object on the electronic device 300. The sensor module 310 may sense the proximity or contact of the external object in various ways.

For example, the sensor module 310 may measure the capacitance of the capacitor included in the sensor module 310. The sensor module 310 may sense the proximity or contact of the external object with respect to the electronic device 300 based on the change amount of the capacitance that is changed in accordance with the proximity or contact of the external object.

As another example, the sensor module 310 may output various types of signals (e.g., infrared rays or ultrasonic waves), and receive signals caused by the output signals being reflected by the external object. The sensor module 310 may sense the proximity or contact of the external object with respect to the electronic device 300 based on the characteristics of the reflected signal (e.g., reception time of the reflected signal or strength of the reflected signal).

According to various embodiments of the disclosure, at operation 620, the electronic device 300 may control the short-range wireless communication module (e.g., short-range wireless communication module 340 of FIG. 3) to output the specified signal through the second antenna (e.g., second antenna 350 of FIG. 3) corresponding to sensing that the external object approaches the specified range of the electronic device.

According to various embodiments of the disclosure, the specified signal may be a signal generated by the short-range wireless communication module 340 to discriminate the kind of the external object or a signal generated by the short-range wireless communication module 340 to perform the short-range wireless communication.

According to various embodiments of the disclosure, at operation 630, the electronic device 300 may receive a second signal in which the phase of the specified signal is changed by the external object, through the second antenna 350.

According to various embodiments of the disclosure, at operation 640, the electronic device 300 may compare the phases of the specified signal and the second signal with each other.

According to various embodiments of the disclosure, the short-range wireless communication module 340 may compare the difference between the phase of the second signal and the phase of the specified signal. The phase of the second signal may differ in accordance with the characteristics of the external object. For example, in case that the external object is a part of the user's body, the phase of the second signal may be earlier than the phase of the specified signal by 60 to 70 degrees. In case that the external object is another object (e.g., metal) that is not a part of the user's body, the phase of the second signal may be earlier than the phase of the specified signal by 90 to 120 degrees.

According to various embodiments of the disclosure, at operation 650, the electronic device 300 may determine whether to control the power being used to output the cellular signal based on the result of comparing the phases of the specified signal and the second signal with each other.

According to various embodiments of the disclosure, the electronic device 300 may check whether the difference between the phase of the second signal and the phase of the specified signal falls within the specified range.

According to various embodiments of the disclosure, in case that the difference between the phase of the second signal and the phase of the specified signal falls within the specified range, the electronic device 300 may reduce the level of the specified power being applied to the communication module 320. In case that the difference between the phase of the second signal and the phase of the specified signal falls within the specified range, the external object that approaches the electronic device 300 may be the part of the user's body. The electronic device 300 may reduce the specific absorption rate of the electromagnetic wave by reducing the level of the specified power being applied to the communication module 320.

According to various embodiments of the disclosure, in case that the difference between the phase of the second signal and the phase of the specified signal does not fall within the specified range, the electronic device 300 may not perform the reduction of the level of the specified power being applied to the communication module 320. For example, in case that the difference between the phase of the second signal and the phase of the specified signal does not fall within the specified range, the electronic device 300 may maintain the level of the specified power being applied to the communication module 320. In case that the difference between the phase of the second signal and the phase of the specified signal does not fall within the specified range, the external object that approaches the electronic device 300 may be another external object that is not the part of the user's body. The electronic device 300 may prevent unnecessary degradation of the cellular communication performance by maintaining the level of the specified power being applied to the communication module 320.

A method for operating an electronic device according to various embodiments of the disclosure may include: checking whether an external object approaches so as to be within a specified range using a sensor module for sensing whether the external object approaches the electronic device while transmitting a cellular signal with a specified power through a first antenna for transmitting the cellular signal; outputting a specified signal through the second antenna for transmitting a short-range wireless communication signal at least based on determination that the external object has approached within the specified range; obtaining a signal caused by the specified signal that is reflected by the external object using the second antenna; checking whether a phase difference between the specified signal and the reflected signal is included within a specified range; and determining whether to adjust the specified power based on the result of the checking.

In the method for operating the electronic device according to various embodiments of the disclosure, the determining of whether to adjust the specified power may include: outputting the cellular signal with a lower power than the specified power in case that the phase difference is included within the specified range; and maintaining the specified power in case that the phase difference is not included within the specified range.

The method for operating the electronic device according to various embodiments of the disclosure may further include: checking whether a phase of the reflected signal is different from a phase of the specified signal as much as a specified value or more; and determining whether to perform adjustment of the specified power based on the result of the checking.

The method for operating the electronic device according to various embodiments of the disclosure may further include adjusting a size of a signal being output to the second antenna based on the checked phase difference.

The method for operating the electronic device according to various embodiments of the disclosure may further include determining whether to perform adjustment of a size of a radiated Wi-Fi signal based on the checked phase difference.

The method for operating the electronic device according to various embodiments of the disclosure may further include: checking whether an external electronic device wirelessly connected to the electronic device exists; checking identification information of the external electronic device in case that the external electronic device exists; and determining whether to perform adjustment of the specified power based on the identification information.

The method for operating the electronic device according to various embodiments of the disclosure may further include determining whether to perform adjustment of the specified power based on a sensing result of a second proximity sensor for sensing proximity nearby a display of the external object and the phase difference between the specified signal and the reflected signal.

The method for operating the electronic device according to various embodiments of the disclosure may further include transmitting a cellular signal adjusted to have a lower power than the specified power corresponding to sensing of the proximity of the external object nearby the display using the second proximity sensor.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a sensor module for sensing whether an external object approaches the electronic device;
a communication module for cellular communication;
a first antenna for the cellular communication;
a short-range wireless communication module for short-range wireless communication;
a second antenna for the short-range wireless communication; and
a processor,
wherein the processor is configured to:
check whether the external object approaches so as to be within a specified range using the sensor module while transmitting a cellular signal with a specified power through the first antenna,
output a specified signal through the second antenna at least based on determination that the external object has approached within the specified range,
obtain a signal caused by the specified signal that is reflected by the external object using the second antenna, and
transmit the cellular signal adjusted to have a lower power than the specified power in case that a phase difference between the specified signal and the reflected signal falls within a specified range, and refrain from adjusting the specified power in case that the phase difference does not fall within the specified range.

2. The electronic device of claim 1, wherein the processor is configured to:
check whether a phase of the reflected signal is different from a phase of the specified signal as much as a specified value or more, and
determine whether to perform adjustment of the specified power based on the result of the checking.

3. The electronic device of claim 1, wherein the short-range communication module is configured to:
check the phase difference between the specified signal and the reflected signal, and
transmit information on the checked phase difference to the processor.

4. The electronic device of claim 1, wherein the short-range communication module is configured to:
check the phase difference between the specified signal and the reflected signal, and
control a signal being output to the second antenna based on the checked phase difference.

5. The electronic device of claim 1, further comprising a Wi-Fi communication module for Wi-Fi communication,
wherein the processor is configured to:
transmit a Wi-Fi signal adjusted to have a lower power than the specified power in case that a phase difference between the specified signal and the reflected signal falls within the specified range, and refrain from adjusting the specified power in case that the phase difference does not fall within the specified range.

6. The electronic device of claim 1, wherein the processor is configured to:
check whether an external electronic device wirelessly connected to the electronic device exists,
check identification information of the external electronic device in case that the external electronic device exists, and
determine whether to perform adjustment of the specified power based on the identification information.

7. The electronic device of claim 1, wherein the sensor module is so configured that the external object senses whether the electronic device is grasped.

8. The electronic device of claim 1, further comprising a second proximity sensor sensing proximity on a display of the electronic device,
wherein the processor is configured to determine whether to perform the adjustment of the specified power based on the sensing result of the second proximity sensor and the phase difference between the specified signal and the reflected signal.

9. An electronic device comprising:
at least a sensor module for sensing whether an external object approaches the electronic device;
a communication module;
at least a first antenna connected to communication module;
a short-range wireless communication module for short-range wireless communication;
a second antenna for the short-range wireless communication; and
a processor,
wherein the processor is configured to:
check whether the external object approaches so as to be within a specified range using the sensor,
output a first signal through the second antenna at least based on determination that the external object has approached within the specified range,
check a phase difference between the first signal and a second signal received by an auto phase control circuit of the short-range communication module, and
control the communication module to transmit a signal adjusted to have a lower power than a specified power in case that a phase of the second signal is not different from a phase of the first signal as much as a specified value or more.

10. The electronic device of claim 9, wherein the processor is configured to control the communication module to transmit a signal adjusted to have a higher power than the specified power in case that a phase of the second signal is different from a phase of the first signal as much as a specified value or more.

11. The electronic device of claim 9, wherein the processor is configured not to perform reduction of the specified power in case that a phase of the second signal is different from a phase of the first signal as much as a specified value or more.

12. The electronic device of claim 9, wherein the processor is configured to:
   check whether an external electronic device wirelessly connected to the electronic device exists,
   check identification information of the external electronic device in case that the external electronic device exists, and
   determine whether to perform adjustment of the specified power based on the identification information.

13. A method for operating an electronic device, comprising:
   checking whether an external object approaches so as to be within a specified range using a sensor module for sensing whether the external object approaches the electronic device while transmitting a cellular signal with a specified power through a first antenna for transmitting the cellular signal;
   outputting a specified signal through the second antenna for transmitting a short-range wireless communication signal at least based on determination that the external object has approached within the specified range;
   obtaining a signal caused by the specified signal that is reflected by the external object using the second antenna;
   checking whether a phase difference between the specified signal and the reflected signal is included within a specified range; and
   determining whether to adjust the specified power based on the result of the checking.

14. The method of claim 13, wherein determining whether to adjust the specified power comprises:
   outputting the cellular signal with a lower power than the specified power in case that the phase difference is included within the specified range; and
   maintaining the specified power in case that the phase difference is not included within the specified range.

15. The method of claim 13, further comprising:
   checking whether a phase of the reflected signal is different from a phase of the specified signal as much as a specified value or more; and
   determining whether to perform adjustment of the specified power based on the result of the checking.

* * * * *